No. 688,743. Patented Dec. 10, 1901.
R. A. MORTON.
VEHICLE.
(Application filed Mar. 16, 1901.)
(No Model.) 3 Sheets—Sheet 1.
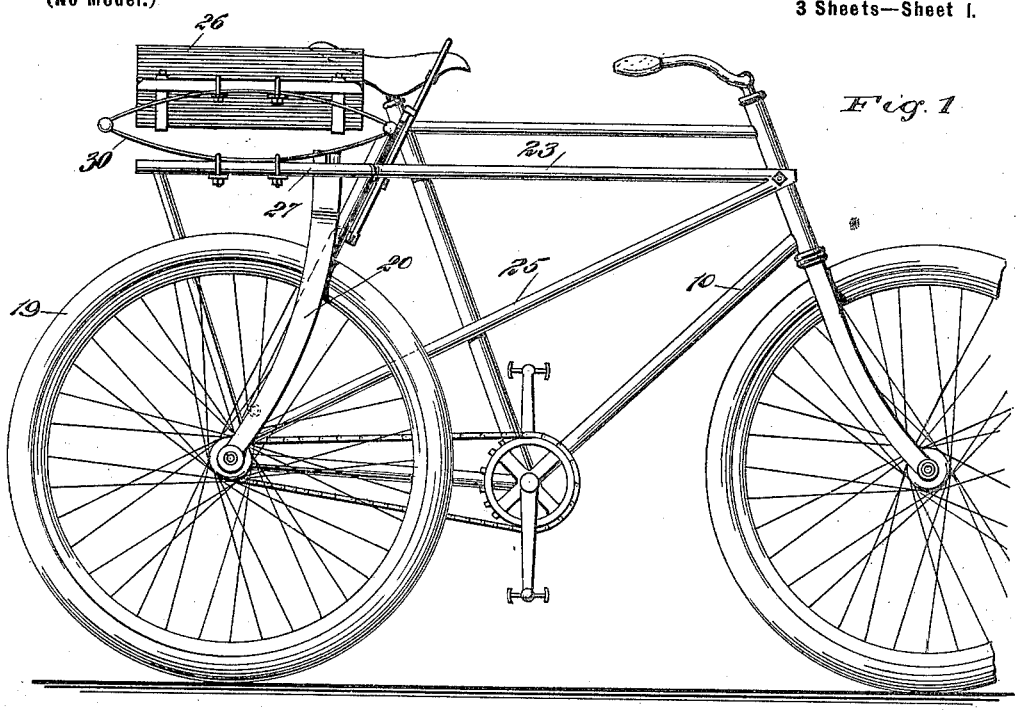
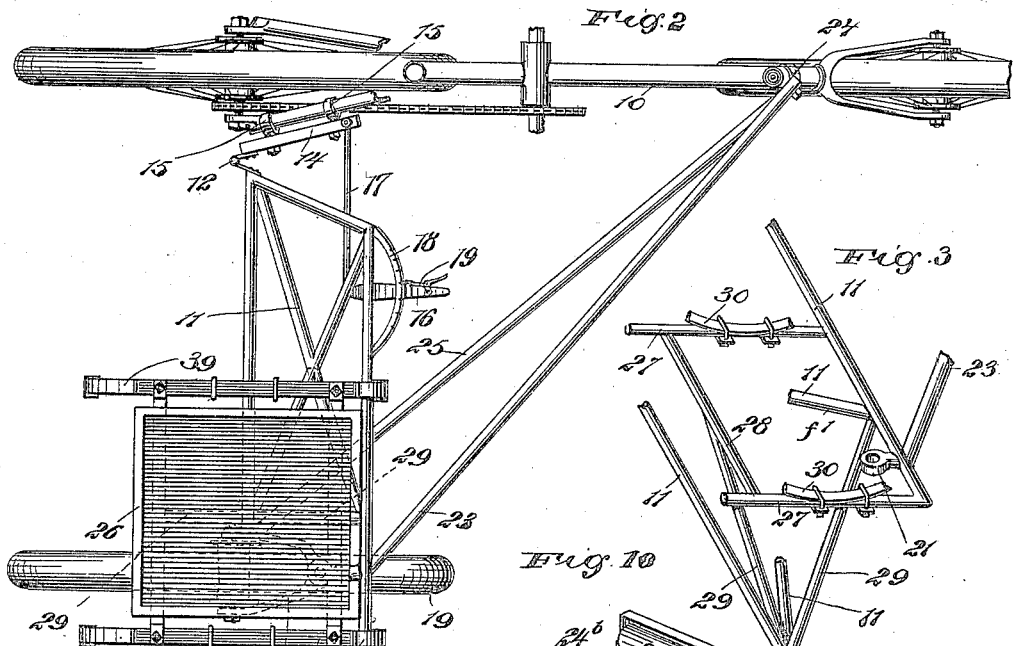
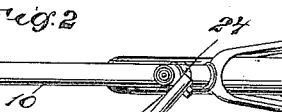
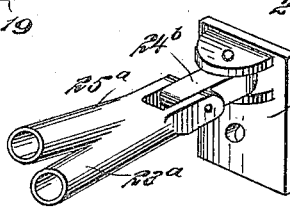
WITNESSES:
INVENTOR
Rolla A. Morton
BY
ATTORNEYS No. 688,743. Patented Dec. 10, 1901.
R. A. MORTON.
VEHICLE.
(Application filed Mar. 16, 1901.)
(No Model.) 3 Sheets—Sheet 2.
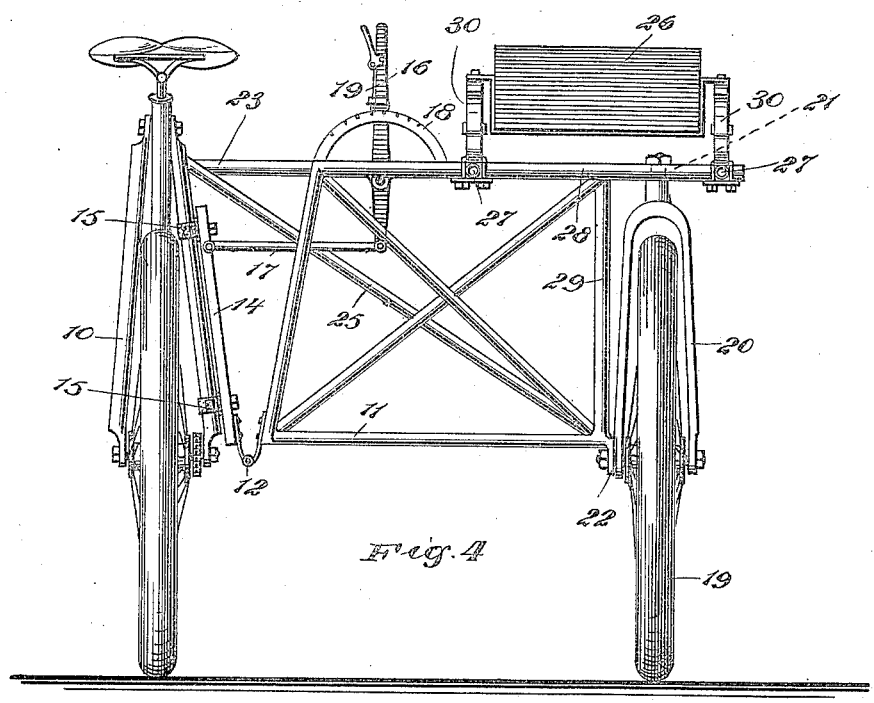
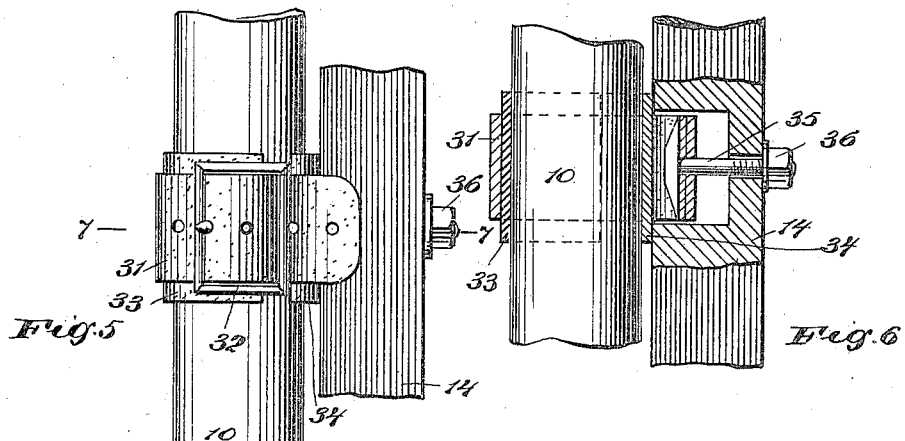
WITNESSES:
INVENTOR
Rolla A. Morton
BY
ATTORNEYS

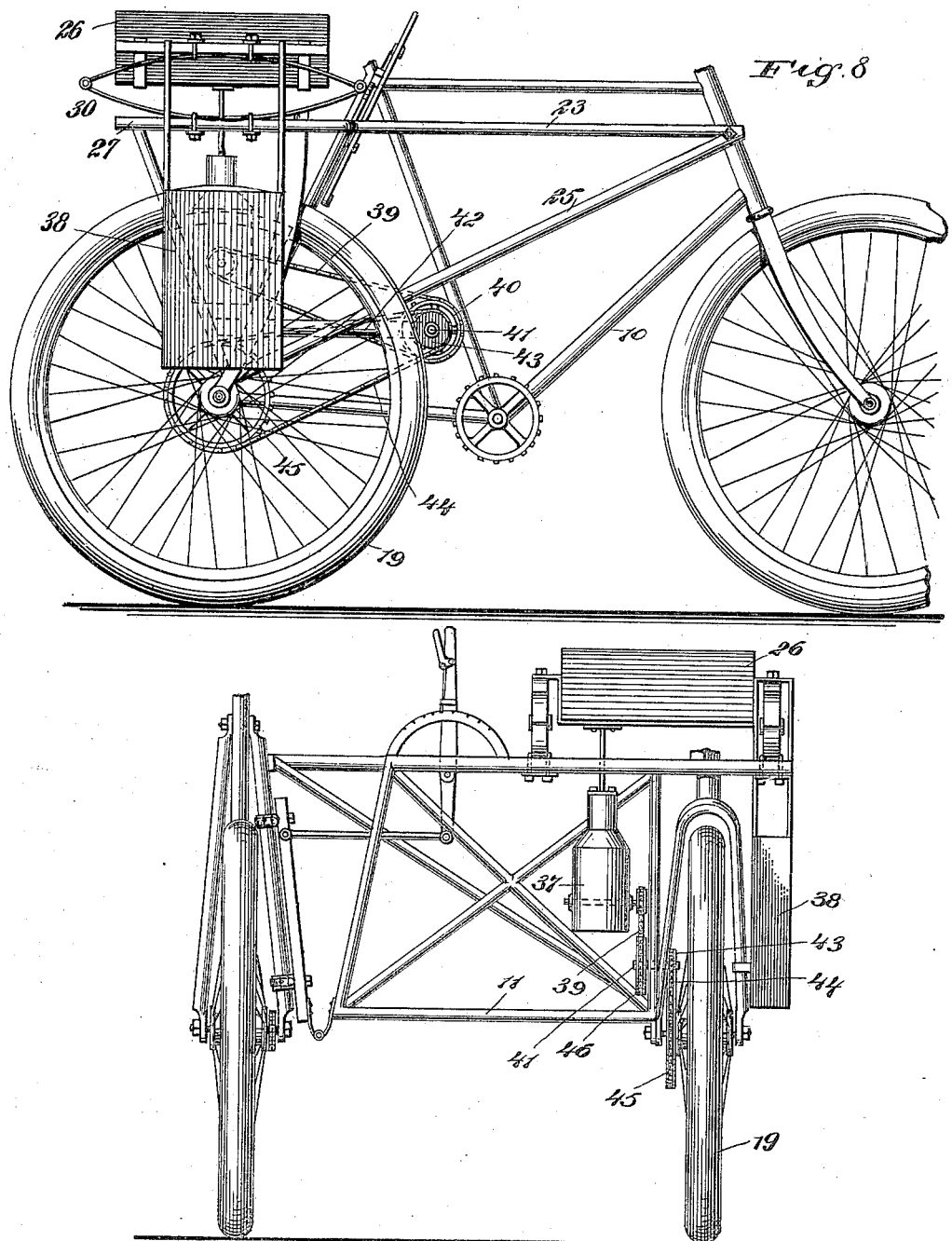

UNITED STATES PATENT OFFICE.

ROLLA ALLEXANDER MORTON, OF SAN JOSE, CALIFORNIA.

VEHICLE.

SPECIFICATION forming part of Letters Patent No. 688,743, dated December 10, 1901.

Application filed March 16, 1901. Serial No. 51,450. (No model.)

*To all whom it may concern:*

Be it known that I, ROLLA ALLEXANDER MORTON, a citizen of the United States, and a resident of San Jose, in the county of Santa Clara and State of California, have invented a new and Improved Vehicle, of which the following is a full, clear, and exact description.

This invention relates to a vehicle which may be propelled either manually or by power and which enables me to combine an ordinary bicycle with certain improved parts, so as to form a tricycle vehicle which may be used to carry packages or other freight or even a plurality of riders, according to the desire of the builder.

This specification is the specific description of two forms of the invention, while the claims define the actual scope thereof.

Reference is to be had to the accompanying drawings, forming a part of this specification, in which similar characters of reference indicate corresponding parts in all the views.

Figure 1 is a side view of the invention. Fig. 2 is a plan view of the same. Fig. 3 is a fragmentary perspective view showing the framing of the attachment, particularly that part of the framing which supports the package-carrier. Fig. 4 is a rear view of the invention. Fig. 5 is a detail view of the clamp for attaching the framing to the bicycle. Fig. 6 is a longitudinal section of the same. Fig. 7 is a cross-section on the line 7 7 of Fig. 5. Fig. 8 is a side view of the machine equipped with a motor of the internal-combustion type. Fig. 9 is a rear view of the same, and Fig. 10 is a detail view of a modification.

Referring to Figs. 1 to 7 of the drawings, 10 represents a safety-bicycle of the usual form. 11 represents an approximately rectangular framing, which stands in essentially a vertical position and which has a hinge 12 at its lower right-hand corner. This hinge 12 joins to a bar 14, which is attached by suitable clamps 15, to be hereinafter described, to the rear part of the bicycle 10. By this arrangement the frame 11 is supported on the bicycle and is capable of swinging with respect thereto around the axis of the pintle of the hinge 12. A hand-lever 16 is fulcrumed on the frame 11 and is connected by a link 17 with the bar 14. By throwing this lever 16 the bicycle 10 may be rocked toward or from the frame 11, and thus the position of the bicycle with respect to the frame 11 may be regulated. A toothed quadrant 18 is attached to the frame 11 and works with a suitable pawl 19 on the hand-lever, so as to hold the hand-lever in the desired position. Any preferred mechanism may be provided for holding the hand-lever 16 in position with respect to the quadrant 18. The hand-lever may be allowed to swing freely under ordinary circumstances and be fitted with devices for holding it under extraordinary conditions and also for permitting it to be shifted manually according to the immediately active conditions attending the use of the vehicle.

The outer portion of the frame 11 is supported by a single wheel 19, which is mounted in a fork 20 similar to the usual rear fork of a safety-bicycle. The upper end of this fork is fastened in a socket 21, carried on the frame 11, and the lower inner arm of the fork is joined to an extension 22 of the frame 11, as shown best in Figs. 3 and 4. It therefore will be seen that by means of the bicycle 10, the frame 11, the wheel 19, and the fork 20 an essentially tricycle structure is produced. This structure may be propelled by a rider seated on the seat of the bicycle 10 and operating the pedals thereof in the usual manner.

From the upper outer portion of the frame 11 a brace 23 passes diagonally to the steering-head of the bicycle 10, to which such brace is attached by means of a clamp 24, similar to the clamps 15 referred to before. From the extension 22 of the frame 11 a brace 25 passes, such brace extending to the clamp 24 and being fastened thereto similarly to the brace 23. These braces 23 and 25 connect the outer part of the frame 11 with the front part of the bicycle 10, and provide a structure which will prevent the sagging backward of the frame 11. The braces 23 and 25 are made to yield slightly, so that the necessary adjustments of the frame 11 may be effected.

On the frame 11 is erected a superframe for carrying a box or receptacle 26 for packages and like freight. This frame consists of two longitudinally-extending bars 27, joined by a cross-bar 28, as best shown in Fig. 3, the bars 27 having their front ends connected with the top bar of the frame 11, and the cross-bar 28 being adjacent to the rear ends of the longitudinal bars 27. Braces 29 project upward from the extension 23 of the frame 11 and are joined, respectively, to the cross-bar 28 and to the top bar of the frame 11, as best shown in Fig. 3, thus holding the frame of the box 26 rigid on the frame 11. The longitudinal bars 28 carry springs 30, which sustain the box 26, as shown. The clamps 15 and 24 are duplicates in construction, and are shown in Figs. 5, 6, and 7. In these figures the bar 14 is shown; but this bar occupies with respect to the clamps essentially the same position as the braces 23 and 25. The clamps consist of flexible straps 31, constructed, preferably, of leather, and provided with buckles 32 for joining their ends together. These straps may be provided on their inner surfaces with wear-pieces 33, also formed of leather or similar material, to cause the straps to firmly engage with the part of the bicycle to which the straps are applied. In Figs. 5, 6, and 7, 10 represents the bicycle. The straps 31 are looped and passed through washers or gaskets 34 and projected into a cavity formed in the bar 14, at which points the straps 33 are engaged with T-headed bolts 35, passed through the bar 14, and having nuts 36, by which the bolts may be tightened. In applying these clamps the straps 31 are fastened tight around the bicycle, and then the nuts 36 are screwed up, so as to increase the tension of the straps, thus engaging the straps with the bicycle with all possible firmness.

Figs. 8 and 9 show my invention with an internal-combustion engine 37 arranged to drive it. This engine is suitably supported from the box or freight-receptacle 26, which receptacle also supports the tank 38 for containing the hydrocarbon with which the engine 37 is operated. The engine 37 drives a sprocket-chain 39, which is passed around a sprocket-wheel 40, to drive the same. This sprocket-wheel is carried on a shaft 41, mounted in an arm 42, supported from the frame 11. The shaft 41 also carries a sprocket-wheel 43, over which a chain 44 passes to a sprocket-wheel 45, mounted on the axis of the wheel 19. In this form of the invention the wheel 19 serves as the traction-wheel, and the pedals of the bicycle 10 may be dispensed with, since they are not necessarily employed.

If desired, the braces 25 and 23 may be constructed quite rigid, and a device, such as that shown in Fig. 10, employed to allow the necessary adjusting movement of the frame 11. This device consists of a body-plate 24$^a$, adapted to be suitably fastened to the bicycle and carrying pivotally a bar 24$^b$. This bar 24$^b$ has pivoted thereto a double socket 25$^a$ 23$^a$, which is adapted to carry the braces 25 and 23. It will be observed that the parts 24$^b$ and 25$^a$ 23$^a$ are universally pivoted, and this allows the movement necessary to the braces 25 and 23.

Having thus described my invention, I claim as new and desire to secure by Letters Patent—

1. In a vehicle, the combination with a bicycle, of a frame with which the bicycle is connected to move relatively thereto, means extending between the bicycle and the frame for effecting such relative movement, and a wheel carried by and supporting the outer part of the frame.

2. In a vehicle, the combination of a bicycle, a frame hingedly attached thereto, means for moving the bicycle with respect to the frame, and a wheel carried by the outer part of the frame and supporting the same.

3. In a vehicle, the combination of a bicycle, a frame hingedly mounted thereon, a hand-lever mounted on the frame, a link extending between the hand-lever and the bicycle to adjust the relative position of the bicycle and the frame, and a wheel carried by and supporting the outer part of the frame.

4. In a vehicle, the combination of a bicycle, a frame hingedly connected thereto, the means for moving the bicycle relatively to the frame, a wheel carried by and supporting the outer part of the frame, and a brace extending from the outer part of the frame diagonally to the front of the bicycle, and connected thereto to permit such relative movement of the bicycle.

5. A vehicle, comprising two wheeled members adjustably connected with each other, a spring-supported motor carried on one member, and gearing extending between the motor and the wheel of the member whereon it is carried, such gearing comprising a movement-transmitting shaft mounted in fixed bearings on said member of the vehicle.

6. A vehicle having a frame, a motor yieldingly supported thereon, a traction-wheel mounted on the frame, and gearing for driving the traction-wheel from the motor, such gearing comprising a movement-transmitting shaft mounted in fixed bearings in the frame and geared with the motor and with the traction-wheel.

In testimony whereof I have signed my name to this specification in the presence of two subscribing witnesses.

ROLLA ALLEXANDER MORTON.

Witnesses:
E. C. BRUNHOUSE,
C. H. JOHNSON.